United States Patent [19]

Kubota et al.

[11] Patent Number: 5,109,333

[45] Date of Patent: Apr. 28, 1992

[54] DATA TRANSFER CONTROL METHOD AND APPARATUS FOR CO-PROCESSOR SYSTEM

[75] Inventors: Kazumi Kubota, Tokyo; Shigeo Tsujioka, Yokohama; Kensuke Ooyu, Otaru; Hitoshi Kawaguchi, Yokohama; Mitsutoshi Uchida, Hadano; Yasuo Kurosu, Yokohama, all of Japan

[73] Assignee: Hitachi, Ltd., Tokyo, Japan

[21] Appl. No.: 338,286

[22] Filed: Apr. 14, 1989

[30] Foreign Application Priority Data

Apr. 15, 1988 [JP] Japan .............................. 63-91406

[51] Int. Cl.$^5$ .............................................. G06F 1/00
[52] U.S. Cl. ..................................................... 395/275
[58] Field of Search ... 364/200 MS File, 900 MS File

[56] References Cited

U.S. PATENT DOCUMENTS

| | | | |
|---|---|---|---|
| 4,309,753 | 1/1982 | Negi | 364/200 |
| 4,447,870 | 5/1984 | Tague | 364/200 |
| 4,729,094 | 3/1988 | Zolnowsky | 364/200 |
| 4,814,977 | 3/1989 | Buonomo | 364/200 |
| 4,894,768 | 1/1990 | Iwasaki | 364/200 |
| 4,926,318 | 5/1990 | Nakayama | 364/200 |

OTHER PUBLICATIONS

Byte, Mar. 1988 v3.
News Release No. 20.
Intel, Microprocessor and Peripheral.
Motorola, MC 68020 32-bit Microprocessor.

Primary Examiner—Douglas W. Olms
Assistant Examiner—T. Samuel
Attorney, Agent, or Firm—Antonelli, Terry, Stout & Kraus

[57] ABSTRACT

A data transfer control apparatus for a co-processor system. The co-processor system includes a memory; a memory bus connected to the memory; a main processor connected to the memory bus and having a control circuit for controlling data read/write relative to the memory, the main processor performing data transfer from/to the memory bus via a first data input/output terminal; and a co-processor connected to the memory bus via a second data input/output terminal. The control apparatus includes a high impedance setting circuit for selectively setting the first data input/output terminal at a high impedance state to electrically isolate the first data input/output terminal from the memory bus; and a control signal generator for selectively outputting a control signal to the high impedance setting circuit to cause the high impedance setting circuit to set the first data input/output terminal at the high impedance state. When the co-processor is to perform data read/write relative to the memory, the control signal generator generates the control signal to cause the high impedance setting circuit to set the first data input/output terminal at the high impedance state, and while the first data input/output terminal is set at the high impedance state, the main processor performs read/write control of the memory bus, and the co-processor performs data transfer from/to the memory bus via the second data input/output terminal.

18 Claims, 11 Drawing Sheets

| $\overline{OE}$ | DIR | DIRECTION OF DATA |
|---|---|---|
| H | * | HIGH IMPEDANCE |
| L | L | A → B |
| L | H | B → A |

*: Don't care (MSB) ... (LSB)

1: DATA TRANSFER BY DATA PROCESSING DEVICE
0: DATA TRANSFER BY PROCESSOR $Q_0$, $\overline{Q}_0$ REPRESENT ONE CLOCK BEFORE STATE OF Q, $\overline{Q}$

| S | R | T | D | Q | $\overline{Q}$ |
|---|---|---|---|---|---|
| L | H | * | * | H | L |
| H | L | * | * | L | H |
| H | H | ↑ | L | L | H |
| H | H | ↑ | H | H | L |
| H | H | OTHER THAN ABOVE | * | $Q_0$ | $\overline{Q}_0$ |

*: Don't care

DATA TRANSFER CONTROL METHOD AND APPARATUS FOR CO-PROCESSOR SYSTEM

BACKGROUND OF THE INVENTION

The present invention relates to a co-processor system having a main processor and co-processors which add to the main processor dedicated functions suitable for various applications. More particularly, the invention relates to a data transfer control method and apparatus for a co-processor system wherein a data processing co-processor which requires frequent read/write relative to an external memory can efficiently access the memory.

One example of conventional methods of transferring data between a co-processor and a memory is described in the document regarding a numerical operation processor 8087 of Intel, U.S.A. (Intel, Microprocessor and Peripheral Handbook Volume I-Microprocessor, 230843-004, pp. 2-122 to pp. 2-143). In this case, when a main processor executes an input/output instruction for a co-processor, the main processor first calculates an address value of the memory and outputs it. After storing the address value as a start address of memory data, the co-processor activates a memory access control circuit included therein to access the memory for necessary words starting from the start address.

Another example is described in a document regarding a microprocessor MC68020 of Motorola, U.S.A. (Motorola, MC68020 32-Bit Microprocessor User's Manual, pp. 8-1 to pp. 8-7).

In this method, for transfer of control information on a co-processor, the main processor reads/writes a transceiver register for transmission/reception relative to the co-processor. In accessing memory data, the co-processor requests a memory read/write from the main processor which in turn performs a memory read/write either by writing data read out from the memory into the transceiver register or by writing data read out from the transceiver register into the memory.

With the former method of the above-described prior art, it is necessary for the co-processor to have therein a memory access control circuit such as a Direct Memory Access Controller (DMAC), resulting in a possible increase in cost and development processes. With the latter method, it is necessary for the main processor to repeat read/write relative to the memory and the transceiver register of the co-processor, thus posing a problem of degrading a data transfer efficiency.

SUMMARY OF THE INVENTION

An object of the present invention is to eliminate the above-described problems of a conventional memory access method for a co-processor, and provide a memory access method for a co-processor and control apparatus therefor capable of accessing a memory with a simple interface and high efficiency.

To achieve such objects, according to the present invention, a main processor is coupled to a memory bus composed of an address bus, a data bus, and a control bus which transfers control signals for memory read/write and timing, whereas a co-processor is coupled only to the data bus and control bus. For memory read/write of the co-processor, the main processor drives the address bus and control bus so that the co-processor monitors the status of the control bus and drives the data bus.

To control memory read/write of the co-processor, the main processor drives and controls the address bus and control bus in the same manner as in a usual memory read/write. Therefore, the memory device connected to the memory bus performs quite the same read/write operation as usual. By regulating the data input/output terminals of the main processor to have a high impedance state, the main processor is electrically isolated from the data bus, therefore allowing the co-processor to directly use the data bus. It is possible for the co-processor to discriminate between memory read and memory write and the timing control status by monitoring the status of the control bus. The co-processor can accordingly perform data transfer relative to the memory via the data bus.

According to the present invention, a co-processor operates simply upon the data bus so that it is not necessary for the co-processor to have therein a complicated memory control circuit. In order for the co-processor to pick up data read out from the memory device, the main processor carries out a memory read control while setting the data input/output terminals thereof at a high impedance state, and the resultant read-out data are read by the co-processor from the data bus. Accordingly, memory data can be given to the co-processor with a simple control and in a shorter time than that required for the case where after the main processor reads data from the memory bus, the read-out data are transmitted to the co-processor. Also, in order for the co-processor to write data in the memory device, the main processor carries out a memory write control while setting the data input/output terminals thereof at a high impedance state, and at the same time the co-processor outputs data to be written onto the data bus, and writes the data in the memory device. Accordingly, data at the co-processor can be written in the memory with a simple control and in a shorter time than that required for the case where the main processor reads data to be written into the memory from the co-processor, and writes the data into the memory.

DESCRIPTION OF PREFERRED EMBODIMENTS

The data transfer control method and apparatus for a co-processor system of this invention will be described with reference to the accompanying drawings.

A first embodiment of this invention will first be described with reference to FIGS. 1 to 4.

Figure 1:
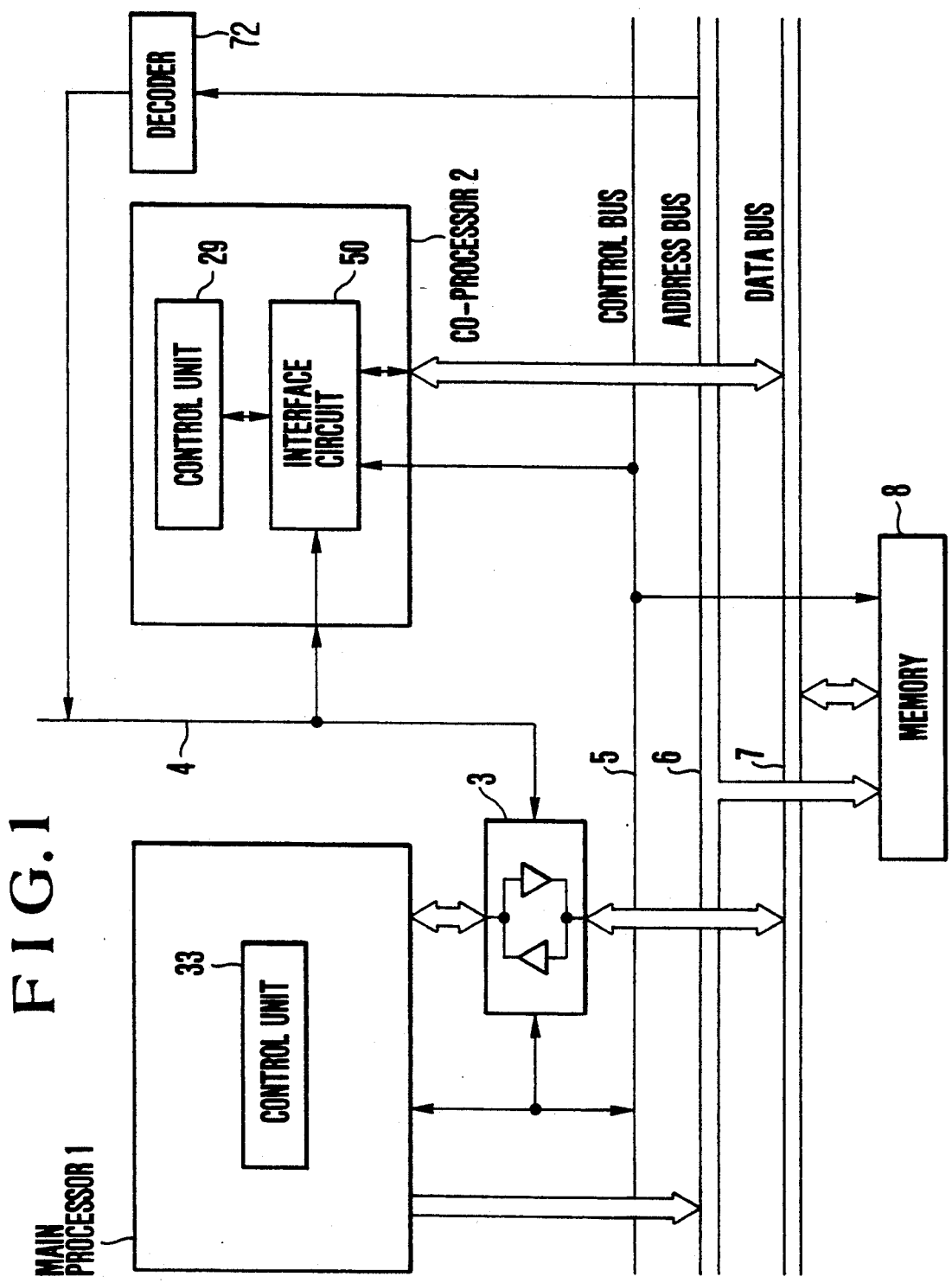
FIG. 1 is a diagram showing the structural outline of a first embodiment of a co-processor system according to the present invention.
Figure 2:
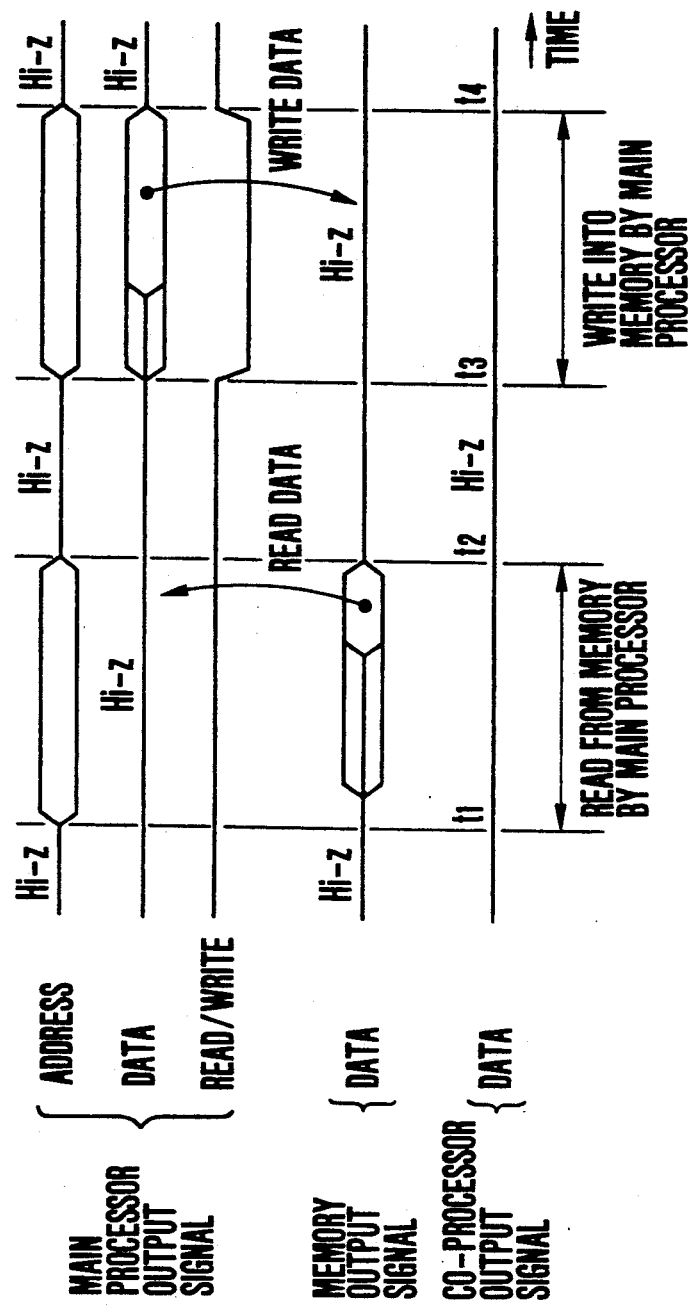
FIG. 2 is a timing chart showing a memory access operation by the main processor of the first embodiment.

FIG. 1 is a block diagram showing the structural outline of a first embodiment of this invention. In FIG. 1, reference numeral 1 represents a main processor, 2 a co-processor, 3 a data transceiver for transmission/reception of data input/output signals between the main processor and a data bus, 4 a co-processor memory access control signal for controlling data read/write of the co-processor relative to a memory device, 5 a control bus of a memory bus for transfer of control signals, 6 an address bus of the memory bus for transfer of address signals, 7 a data bus of the memory bus for transfer of data signals, and 8 a memory device connected to the memory bus. FIG. 2 is a timing chart showing a memory access operation by the co-processor of the first embodiment shown in FIG. 1. The memory bus is a general term for the busses 5, 6 and 7.

Referring to FIG. 1, the main processor has a control unit 33 for performing an input/output control and execution control of the main processor. The co-processor 2 has a control unit 29 for performing an execution control and input/output control of the co-processor 2, and a data bus interface circuit 50 for controlling a memory access by the co-processor in response to the co-processor memory access control signal 4. The interface circuit 50 will be later described.

In FIG. 1, the main processor 1 is connected via the data transceiver 3 to the data bus 7. The data transceiver 3 has the following functions. Namely, when the main processor 1 performs a read/write operation via the memory bus, the input/output direction of the data transceiver 3 is switched to thus control the input/output direction of the main processor 1. In addition, by using the co-processor memory access control signal 4, the input/output terminals of the main processor 1 are set at a high impedance state with priority over the control of the control bus 5, to thereby electrically isolate the main processor 1 from the data bus 7. While the data transceiver 3 is maintained at a high impedance state, the co-processor 2 performs data transfer to and from the data bus 7 and data read/write of the memory device 8.

For data read/write of the memory device 8 by the main processor 1, as shown in the timing chart of FIG. 2, the main processor first outputs an address signal and a memory bus control signal such as a read/write signal. In accordance with these signals, in the case of memory read, the memory device 8 outputs the data to be read, and the main processor 1 reads the read-out data (time t1 to t2). In the case of memory write, the main processor 1 outputs an address signal and a memory bus control signal as well as the data to be written, and the outputted data from the main processor 1 are written into the memory device 8 (time t3 to t4). During the memory read/write, the data transceiver 3 performs an input/output control in accordance with the co-processor memory access control signal, whereas the co-processor does not perform the memory read/write so that the data input/output terminals of the co-processor 2 are set at a high impedance state in accordance with the co-processor memory access control signal 4 so as not to interfere with the memory read/write by the main processor.

Hi-Z shown in FIG. 2 indicates that an associated signal transmission line is at a high impedance.

Also, for data read/write of the memory device 8 by the co-processor, the main processor outputs an address signal and a memory bus control signal. The data transceiver 3 is set at a high impedance state in accordance with the co-processor memory access control signal 4 so that use of the data bus 7 is assigned from the main processor to the co-processor 2. Therefore, the co-processor is allowed to use the data bus 7 in accordance with the co-processor memory access signal 4.

Accordingly, in the case of data read from the memory device, the co-processor 2 reads therein the readout data in accordance with the address signal and memory bus control signal outputted from the main processor 1. On the other hand, in the case of data write into the memory device, the data to be written into the memory device 8 are outputted from the data input/output terminals of the co-processor 2 in synchronism with the output timings of the address signal and memory bus control signal from the main processor 1, and the outputted data from the co-processor 2 are written in the memory device 8 at the address designated by the main processor 1.

The co-processor memory access control signal 4 may be obtained by providing a decoder 72 which outputs the control signal 4 upon detection of a co-processor address signal which is outputted together with the memory access address and the like from the main processor onto the address bus.

As described above, according to the embodiment, memory read/write control can be performed substantially by utilizing a control unit 33 contained in the main processor, so that it is only necessary for the co-processor to have therein, in addition to a control unit 29, a simple interface circuit 50 which performs only a data input/output control. Therefore, there is an advantageous feature that the embodiment can be practiced readily at a low cost. Further, for the co-processor memory read/write, the main processor is required only to perform the same memory control as the main processor memory read/write, without the necessity of performing specific services for the co-processor, for example, a service for additionally transferring the data read out from the memory to the co-processor. Accordingly, there is another advantageous feature that the main processor as well is not required to additionally have specific hardware and the overhead of the main processor for services to the co-processor is at a minimum.

In the embodiment shown in FIG. 1, the data transceiver 3 is provided outside of the main processor 1 for description simplicity. However, a single LSI device of the main processor 1 including the data transceiver in its internal logic circuits can be realized very easily using current LSI technology.

Figure 4:
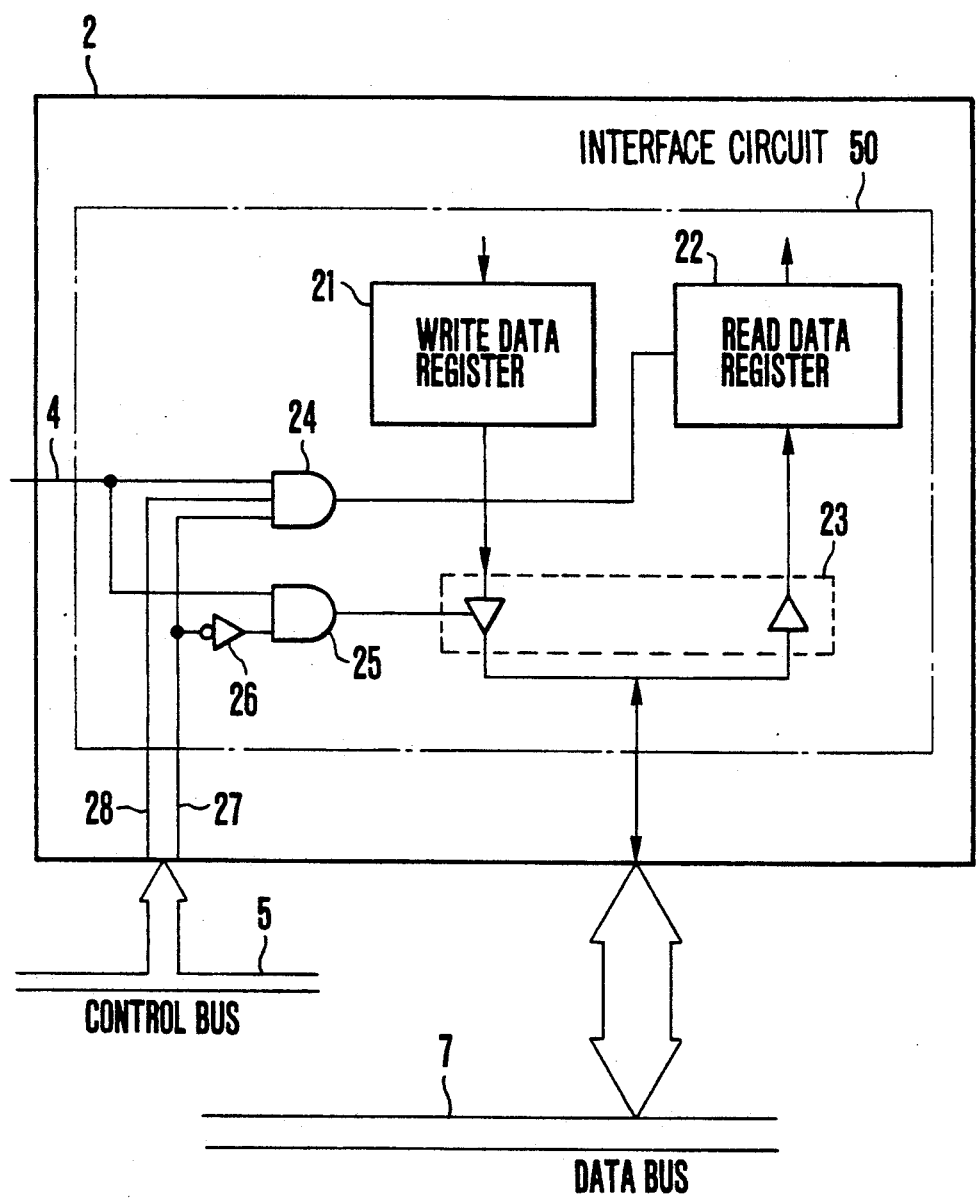
FIG. 4 is a circuit diagram showing an example of the data bus interface circuit of the co-processor shown in FIG. 1.

FIG. 4 is a block diagram showing an example of the data bus interface circuit 50 built in the co-processor 2 shown in FIG. 1.

Figure 3:
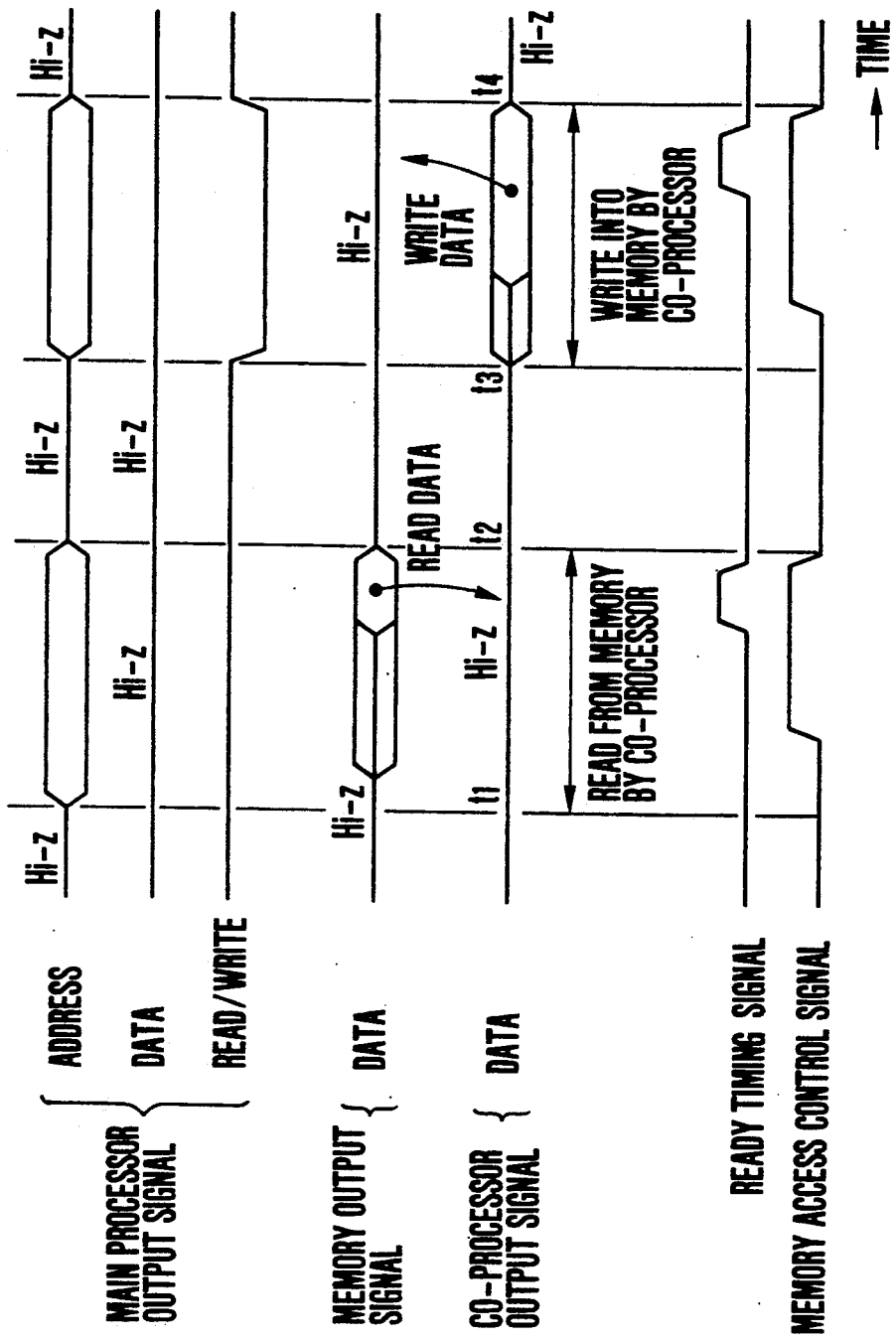
FIG. 3 is a timing chart showing a memory access operation by the co-processor of the first embodiment.

In FIG. 4, corresponding constitutional portions to those in FIG. 1 are represented by identical numerals. In FIG. 4, reference numeral 21 represents a write data register for writing data into the memory, 22 a read data register for reading data from the memory and reading data into the co-processor 2, 23 a data transceiver included in the co-processor 2 for data transmission/reception to and from the data bus 7, 24 and 25 AND gates, 26 an inverter, 27 a read/write control signal supplied from the control bus 5, 28 a ready timing signal supplied from the control bus 5. The read/write control signal 27 is a signal instructing the memory bus if data are read or written. In FIG. 4, data read is carried out when the read/write control signal 27 takes a logical value of, for example, "1", and data write is carried out when it takes a logical value "0". There are other methods other than the above method, which include a method of carrying out memory read/write by providing an independent signal for the read/write control signal, a method of carrying out memory read/write by coding the read/write control signal combined with another signal, outputting the coded signal onto the control bus, and decoding it at the device connected to the memory bus to carry out the corresponding decoded operation, and other methods. Any arbitrary method can be freely selected on the condition that the essential performance of designating read or write operation is satisfied. The ready timing signal 28 is a signal indicating the end of read/write from the memory bus, as shown in FIG. 3. For the case of read operation, it indicates that effective read data have been outputted from the memory onto the data bus 7. In the example shown in FIG. 4, a timing for reading effective data from the data bus 7 during memory read is notified by the ready timing signal 28. In order to carry out memory read, it is necessary in general, even for a system having a different memory bus configuration, to know a timing when effective data are outputted from the memory onto the bus. Therefore, a timing signal corresponding to the ready timing signal 28 can be generated from the bus control signal.

The operation of the data bus interface circuit of the co-processor shown in FIG. 4 will be described below with reference to FIG. 3.

In the case where the co-processor 2 reads the data read out from the memory, the read/write control signal 27 takes a logical value "1" so that the output of the AND gate 25 is fixed at a logical value "0" by means of the inverter 26. As a result, the output terminal of the data transceiver 23 becomes a high impedance state to thus enable the receivers to receive data from the data bus 7. The co-processor memory access control signal 4 gives the co-processor 2 a logical value "1" instructing a memory read, in synchronism with a memory read timing. In this condition, when the ready timing signal 28 takes a logical value "1" indicating an effectiveness of the data on the data bus 7, the output of the AND gate 24 becomes a logical value "1" so that the read data are read in the co-processor 2 via the register 22.

In the case where the co-processor 2 writes data into the memory 8, the read/write control signal 27 takes a logical value "0" so that the output of the AND gate 24 is fixed at a logical value "0". As a result, the read data in the register 22 are not read in the co-processor 2. In order to notify the co-processor 2 of a memory write, the co-processor memory access control signal 4 takes a logical value "1" in synchro with a write timing into the memory 8. On the other hand, the read/write control signal 27 is inverted by the inverter 26 from its logical value "0" to "1" which is inputted to the AND gate 25. Accordingly, the AND gate 25 outputs a logical value "1" so that the data transceiver 23 outputs the write data from the register 21 onto the data bus 7 as the write data into the memory.

As described in the foregoing, according to the embodiment, the memory interface circuit 50 built in the co-processor 2 can be realized with a very simple structure as shown in FIG. 4.

It is to be noted that the interface circuit may be provided outside of the co-processor.

In the first embodiment of this invention shown in FIGS. 1 to 4, it is necessary to supply the co-processor memory access control signal 4 to switch the read/write of the memory 8 between the main processor 1 and the co-processor 2. Since the co-processor memory access control signal 4 issues for the read/write operation of the memory 8 which operation is controlled substantially by the main processor 1, it can be generated by analyzing the operation status and instruction execution of the main processor 1. There is a simplest method for this wherein the address space of the memory bus is divided into a main processor memory space and co-processor space, and the decoder 52 decodes an address signal generated by the main processor while performing a memory read/write as described above, to thus obtain a co-processor memory access control signal 4.

Figure 5:
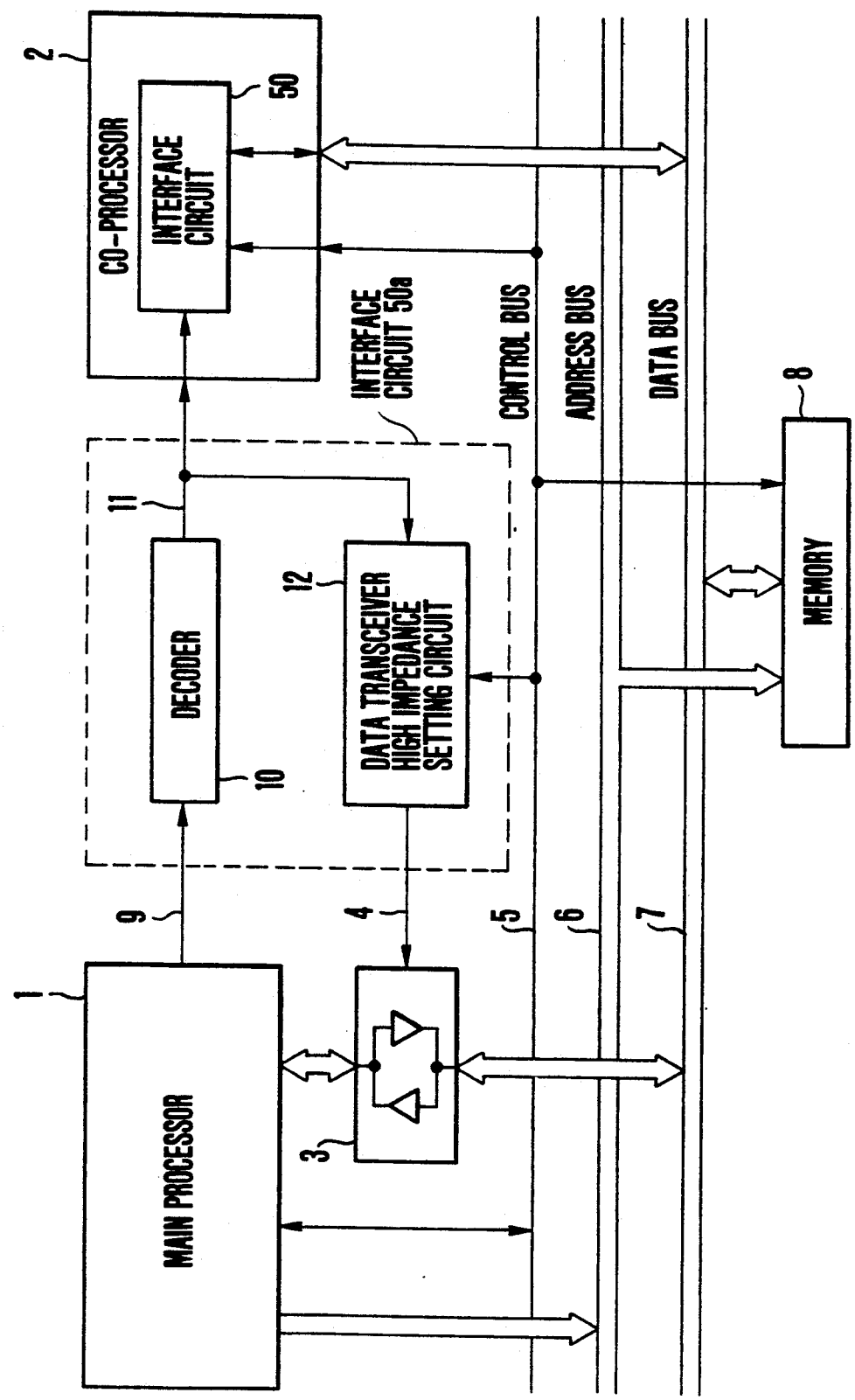
FIG. 5 is a diagram showing the structural outline of a second embodiment of this invention.

There is another method analogous to the above method, as in the case of the second embodiment shown in FIG. 5, wherein a status signal generated by the main processor is decoded to selectively use a co-processor memory access control signal between first and second statuses of the main processor memory read/write. There is a further method wherein a memory read/write control instruction for the co-processor is defined within an instruction set of the main processor, and at the same timing when the main processor executes the instruction set, a co-processor memory access signal is controlled. For such a method, there are a method (FIG. 5) wherein the decoded result of an instruction under execution is outputted directly as a co-processor memory access control signal from the instruction execution unit of the main processor, and a method (FIGS. 7 and 8) wherein the instruction word fetched from the memory in order for the main processor to execute a program and the instruction execution status of the main processor, are supervised, to thus obtain a co-processor memory access control signal.

FIG. 5 is a block diagram showing the second embodiment which controls data transfer between the co-processor 2 and the memory 8 by using the above-described method of generating a memory access control signal for the co-processor 2 by supervising the instruction execution status of the main processor 1. In FIG. 5, corresponding constitutional elements to those shown in FIGS. 1 to 4 are represented by identical numerals. In FIG. 5, reference numeral 9 represents a main processor status signal for transmitting an instruction execution status of the main processor and information regarding an executed instruction, 10 a decoder for decoding the main processor status signal 9 to detect if the main processor is ready for executing or is now executing a memory read/write control instruction for the co-processor, 11 a co-processor memory access acknowledge signal outputted from the decoder 11, 12 a data transceiver high impedance setting circuit which upon reception of the co-processor memory access acknowledge signal 11 generates the co-processor access control signal 4 which sets the data transceiver 3 at a high impedance in synchronism with a control signal timing on the control bus 5.

Figure 6:
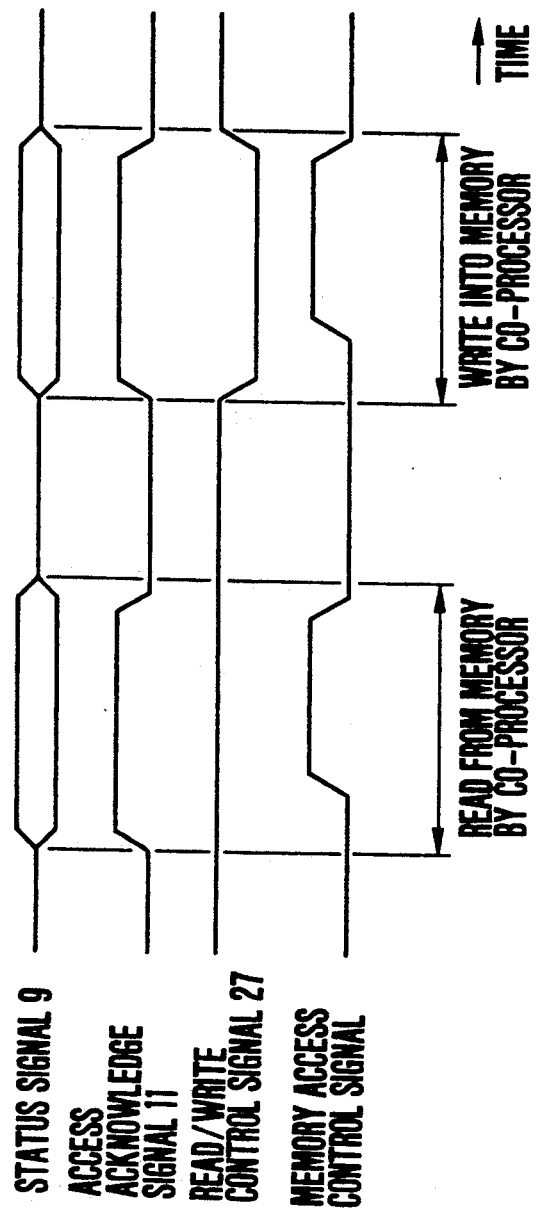
FIG. 6 is a timing chart used for explaining the operation of the embodiment shown in FIG. 5.

The high impedance setting circuit 12 may be an AND gate for outputting the control signal 4 upon reception of, for example, the acknowledge signal 11 and a control signal from the control bus, for example, a read/write control signal. FIG. 6 is a timing chart illustrating the operation of the high impedance setting circuit. The decoder 10 and high impedance setting circuit 12 constitute an interface circuit 50a. The interface circuit 50 in the co-processor 2 may have the same structure as that shown in FIG. 4. In this case, the access acknowledge signal 11 from the decoder 10 is inputted in place of the co-processor memory access request signal 4.

Referring to FIG. 5, as the main processor 1 executes a memory read/write control instruction for the co-processor 2, the decoder decodes the status signal 9 from the main processor and generates the co-processor memory access acknowledge signal 11 having, for example, a logical value "1" (FIG. 6). Upon reception of the co-processor memory access acknowledge signal 11, the co-processor 2 obtains a right of using the memory bus so that data transfer to and from the data bus is performed in synchronism with the memory bus timing from the control bus. During this period, the data transceiver high impedance setting circuit 12 generates, upon reception of the co-processor memory access acknowledge signal 11, the co-processor memory access control signal 4 at the timing of a control signal from the control bus 5, to thus set the data transceiver 3 at a high impedance state and electrically isolate the main processor 1 from the data bus 7 in order not to interfere with data transfer by the co-processor 2.

According to the embodiment shown in FIG. 5, the co-processor memory access control signal 4 can be generated by the decoder 10 and data transceiver high impedance setting circuit 12 which follows the timings from the control bus. Further, the co-processor memory access control signal 4 is generated in accordance with the decoded result of the main processor status signal 9 and the operation timings of the control bus. Therefore, even if the memory read/write control operation of the main processor 1 is suspended due to some reason, for example, due to another processor using the bus or other reasons, there will be no interference with the read/write of the co-processor 2.

Specifically, since the co-processor 2 carries out a memory read/write in response to the access acknowledge signal 11 associated with the main processor 1, a memory read/write control can be carried out without being influenced by the state of another processor.

During an execution control with an instruction pre-fetch scheme wherein while the main processor 1 executes an instruction word, an instruction to be executed next is read from the memory, it is necessary to supervise the status signal of the main processor 1 and memory bus control status in order to know the execution time of the instruction word pre-fetched externally of the main processor 1. The embodiment shown in FIG. 5 is advantageous in that it can readily deal with such a situation.

In order to discriminate an instruction for controlling a memory read/write of the co-processor 2 upon decoding an instruction under execution by the main processor 1, it is necessary to define an instruction word for controlling a memory read/write of the co-processor 2 within an instruction set of the main processor 1. According to the present invention, in executing an instruction for a memory read/write of the co-processor 2, it is necessary for the main processor 1 to perform the same memory bus control as in a usual memory read/write. To this end, it is simple if co-processor input/output information for designating which one of the main processor 1 and the co-processor 2 is to perform a memory read/write is added to the definition of a memory read/write instruction word of the main processor 1. Specifically, while the main processor 1 interpreting and executing a memory read/write instruction word performs a memory read/write operation irrespective of the content of the co-processor input/output control information, it is possible to generate a co-processor memory access control signal, control the co-processor 2 for data transfer relative to the data bus, and perform a high impedance setting control of the data transceiver 3 of the main processor 1.

A timing when the co-processor is requested to perform a memory read/write is determined based on the process contents and required process time of the co-processor. However, there is a case that it is difficult for the main processor to estimate such a timing for control of the memory read/write of the co-processor. There is a method of solving this problem wherein the co-processor requests a memory read/write operation to the main processor when a memory read/write becomes necessary during a process, and in response to the request from the co-processor the main processor services the memory read/write.

Figure 7:
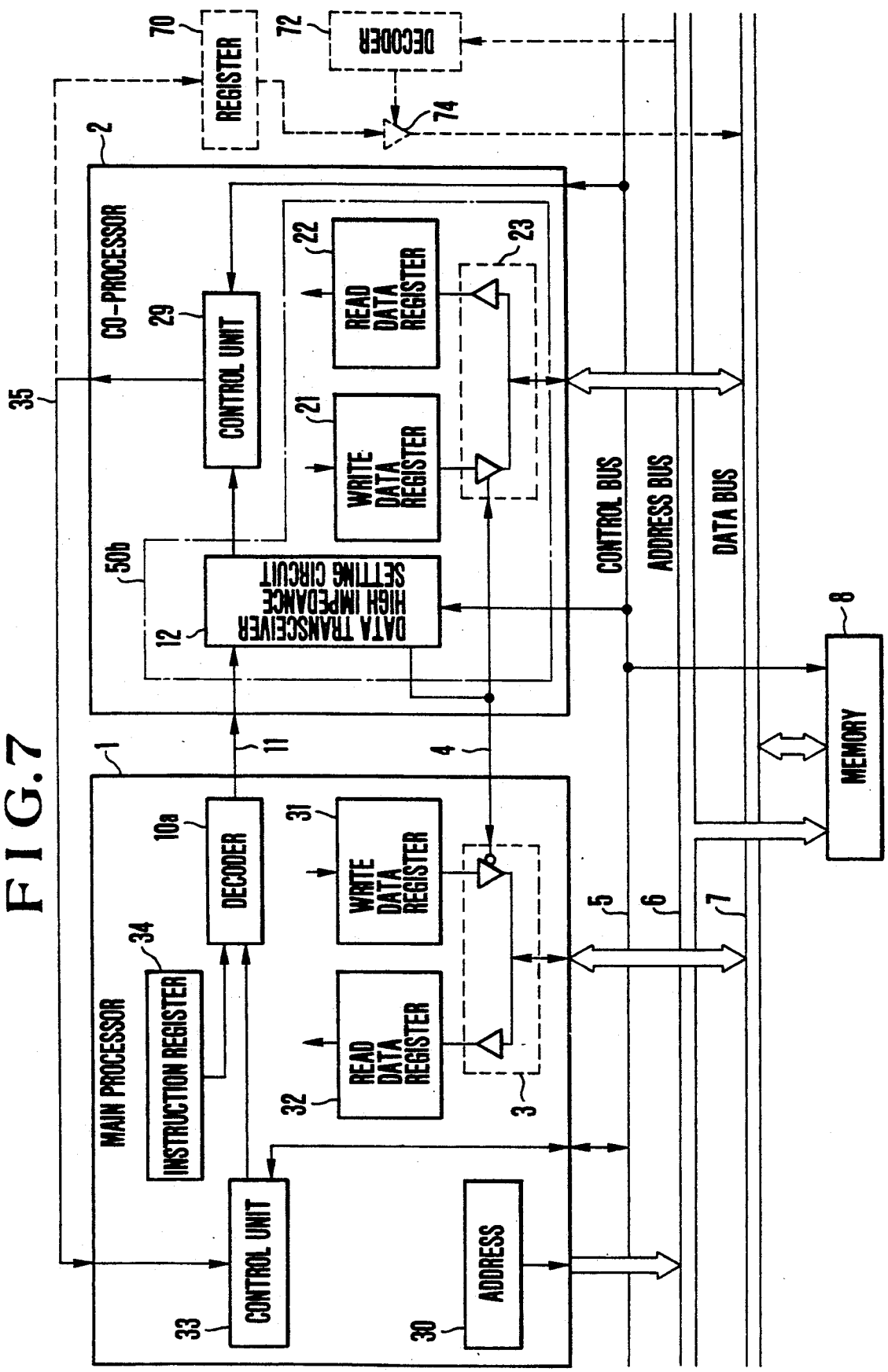
FIG. 7 is a diagram showing the structure of a third embodiment of the invention.
Figure 8:
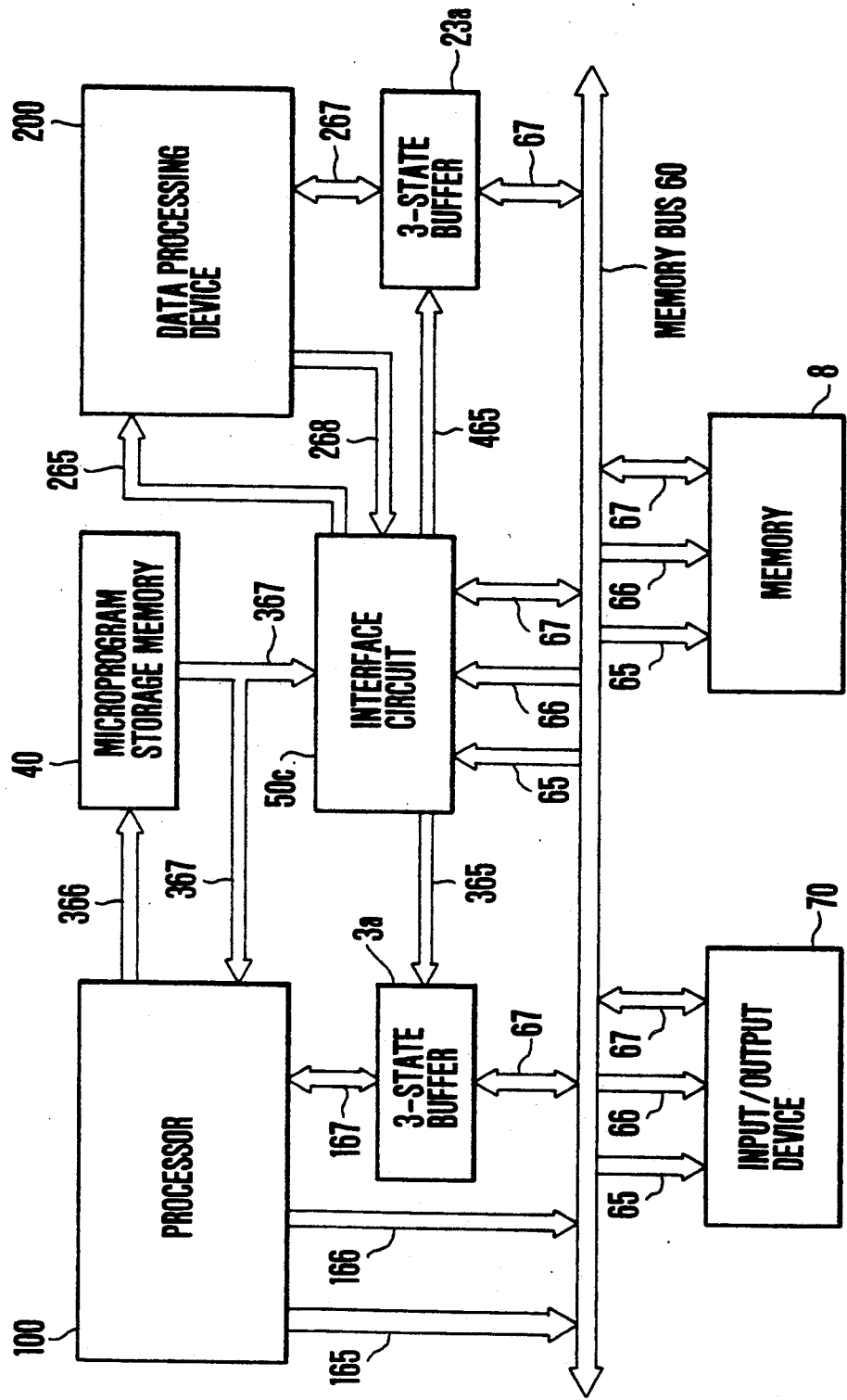
FIG. 8 is a diagram showing the structural outline of a fourth embodiment of the invention.

FIG. 7 is a block diagram showing a third embodiment of this invention which uses the above-described method wherein the co-processor 2 requests a read/write service of the memory 8 to the main processor 1. In FIG. 7, corresponding circuit portions to those in FIGS. 1 to 5 are represented by identical numerals. In FIG. 7, reference numeral 29 represents a control unit for performing an execution control and input/output control of the co-processor 2, 30 an address which is outputted when the main processor 1 performs a memory read/write, 31 a write data register used for outputting write data when the main processor 1 performs a memory write, 32 a read data register used for reading data in the main processor 1 when the main processor 1 performs a memory read, 33 a control unit for performing an execution control and input/output control of the main processor 1, 34 an instruction register for storing an instruction word to be executed by the main processor 1, and 35 a service request signal upon which the co-processor 2 transmits a memory read/write service request to the main processor 1.

In the embodiment shown in FIG. 7, the data transceiver 3 and a decoder 10a are provided within the main processor and the data transceiver high impedance setting circuit 12 is provided within the co-processor 2 by way of example. However, these may be provided outside of the main processor and co-processor.

In FIG. 7, it is to be noted that although the constitutional elements within the main processor 1 are substantially the same as in a conventional main processor, there are differences in that the output of the decoder 10a is used as the access acknowledge signal 11 in response to the service request signal 35 and that the data transceiver 3 is controlled in accordance with the memory access signal 4. The high impedance setting circuit 12 within the co-processor 2, data transceiver 23 and registers 21 and 22 constitute an interface circuit 50b. That the co-processor 2 has such an interface circuit 50b and that the service request signal 35 is outputted from the control unit 29 are differences from a conventional co-processor.

In the embodiment shown in FIG. 7, in the case where the main processor 1 performs a memory read/write, the write data and read data are transferred via the data transceiver 3 between the main processor 1 and data bus 7. In the case where the co-processor 2 performs a memory read/write, the control unit 29 of the co-processor 2 generates the service request signal 35 to request the main processor 1 for the memory read/write service. The control unit 33 of the main processor 1 receives the service request signal 35 as an interruption request so that the execution control is passed to a service program which performs a memory read/write service for the co-processor 2. Upon execution of a memory read/write control instruction of the service program, an instruction word is loaded in the instruction register 34. When the state where the control unit 33 is executing the instruction is established, the decoder 10a decodes the instruction word in response to the control unit 33 and generates a co-processor memory access acknowledge signal 11. The decoder 10a does not generate the co-processor memory access acknowledge signal 11 when the control unit 33 has not yet started execution of a loaded instruction, namely, when the control unit 33 is loading an instruction word in the instruction register 34, or when an execution of an instruction word, although loaded in the instruction register 34, is suspended because external resources such as memories or internal resources such as registers in the main processor 1 and instruction processing units are still being used in executing the preceding instruction word.

In the above-described manner, by delaying the generation of the co-processor memory access acknowledge signal 11 until the preceding instruction word of the main processor 1 is executed completely, it is possible to avoid interference of input/output timings and resource assignments between the co-processor 2 and main processor 1.

Particularly in the case where the main processor 1 is constructed in accordance with the instruction prefetch scheme to improve its performance by loading an instruction to be executed next in the instruction register 34 in parallel with performing an execution process of an instruction word by the main processor 1, there occurs, for example, a case where an input/output control instruction for the co-processor to be executed next is loaded in the instruction register 34 while the main processor 1 performs a memory read/write. Therefore, it becomes necessary to perform the above-described generation of the co-processor memory access acknowledge signal 11 in accordance with the execution status of the control unit 33.

Upon reception of the co-processor memory access acknowledge signal 11, the data transceiver high impedance setting circuit 12 outputs the co-processor memory access control signal 4 in order to notify at the control signal timing the control unit 29 of the fact that an input/output operation is allowed, sets the data transceiver 3 of the main processor 1 at a high impedance state to thereby electrically isolate the main processor 1 from the data bus 7, and further allows the co-processor to transfer data to and from the data bus 7 via the data transceiver 23. Upon execution of a memory read/write control instruction of the co-processor loaded in the instruction register 34 by the main processor 1, the memory read/write operation starts. Then, the main processor 1 drives the control bus 5 and address bus 6 so that the memory read/write is carried out and the data bus 7 is used by the co-processor. Thus, the data read out from the memory are read as the read data 22 of the co-processor 2, or the write data 21 of the co-processor 2 are written in the memory.

As described so far, according to the embodiment shown in FIG. 7, the co-processor requests a service to the main processor when a memory read/write becomes necessary. Only upon reception of a service request, the main processor executes a memory read/write control instruction for the co-processor. Therefore, the main processor can perform a process independently from the process/service of the co-processor while a service is not being requested.

In the above method, the service request signal is outputted to the main processor as an interruption request. However, as shown by a broken line in FIG. 7, instead of outputting the service request signal 35 to the main processor, there is another method wherein the co-processor stores the request status of a memory read/write in a register, the main processor reads the register at a desired time to check if there is a memory read/write request from the co-processor, and if there is a request, the memory read/write service is accordingly performed. Specifically, the following arrangement may be used wherein the co-processor 2 stores the service request signal 35 in a register 70, and when the main processor accesses a decoder 72 via the address bus, a gate 74 opens to accordingly perform a memory read/write service.

FIGS. 8-9, 10A-10C, and 11 are used for explaining a fourth embodiment of this invention. In the embodiment, as shown in the structural outline shown in FIG. 8, a data processing device 200 such as an image processor is used as the co-processor, three-state buffers are used as data transceivers 3a and 23a, an input/output device 70 is connected to a memory bus 60 comprising a control bus, address bus and data bus, and a microprogram storage memory 40 is provided externally of a processor 100 serving as the main processor.

In the embodiment, the processor 100 outputs an address and bus control signal to an address line 66 and control line 65 of the memory bus 60 so that data can be transferred to and from a memory 8 or input/output device 70. The processor also causes the microprogram to be stored in a dedicated memory 40, and causes a process sequence to be fetched into a decoder within the processor via a data line 367 by outputting an address to an address line 366. The data processing device 200 has no mean for generating an address and bus control signal, but it reads data therein via a data line 267 in accordance with the combination of signals inputted from a control line 265, and after completion of the processing, notifies the external circuitry of the processing completion via a status line 268.

Specifically, in order to make the data processing device 200 to perform data processing, an instruction defining an operation to be performed by the data processing device 200 is inputted from the control line 265, and data input/output necessary for executing the instruction is carried out via the data line 267. It is not possible to supply a next processing instruction to the data processing device 200 during the time when the data processing device 200 is executing an instruction inputted from the control line 265. Therefore, after confirming the completion of an execution process of the instruction by checking the status of the status line 268, the processing instruction to be executed next is supplied to the data processing device 200 via the control line 265.

An interface circuit 50c is provided in order that the processor 100 can perform the above-described control of the data processing device 200. When the control line 65 and address line 66 of the memory bus 60 indicate that a processing instruction of the predetermined data processing device 200 is to be issued, the interface circuit 50c defines the operation of the data processing device 200 via the control line 265 in accordance with the signal on the memory bus 60. At the same time, the interface circuit 50c supervises from a data line 367 an instruction word read by the processor 100 from the microprogram storage memory 40 to thus detect that the processor 100 is to perform an input/output control of the data processing device 200. Then, the data bus 60 is selectively used between the processor 100 and the data processing device 200 by controlling the three-state buffers 3a and 23a via the control lines 365 and 465.

Further, when the control line 65 and address line 66 of the memory bus 60 indicate to read the status line 268 of the predetermined data processing device 200, the interface circuit 50c outputs the status of the status line 268 to the data line 67 of the memory bus 60 so as to allow the processor 100 to read the status line 268 of the data processing device 200.

An external processor which controls the data processing device 200 is inputted with a control signal from the control line 265 in accordance with the result indicated by the status line 268 to be described later in detail, and receives the processed data from the data line 267. The three-state buffers 3a and 23a operate in accordance with the truth table shown in FIG. 10A to be described later in detail. The interface circuit 50c generates control signals for the data processing device 200 and the three-state buffers 3a and 23a on the basis of the data outputted from the storage memory 40 and the control signal inputted via the control line 65. In addition, the interface circuit 50c has the following functions. Namely, the interface circuit 50c latches a flag representative of data processing completion outputted via the status signal 268 and a flag representative of a data transfer request, and upon access from the processor 100, the flag is outputted to the memory bus 60. The interface circuit 50c latches an instruction outputted from the processor 100 to the data processing device 200, and outputs it when necessary via the control line 265. The interface circuit 50c is constructed of a decoder 10b and a data transceiver high impedance setting circuit 12a similar to the embodiment shown in FIG. 5. The particular arrangement of the data transceiver high impedance setting circuit 12a will be detailed with reference to FIG. 9. Data are outputted from or inputted into the memory 8 connected to the common bus 60 via the data line 67 in accordance with an address and control signal sent via the address line 66 and control line 65. The input/output unit 70 has a function that data are inputted to or outputted from an external storage (not shown), or outputted to a display (not shown), respectively via the data line 67 of the common bus 60 in accordance with an address and control signal sent from the address line 66 and control line 65.

Figure 9:
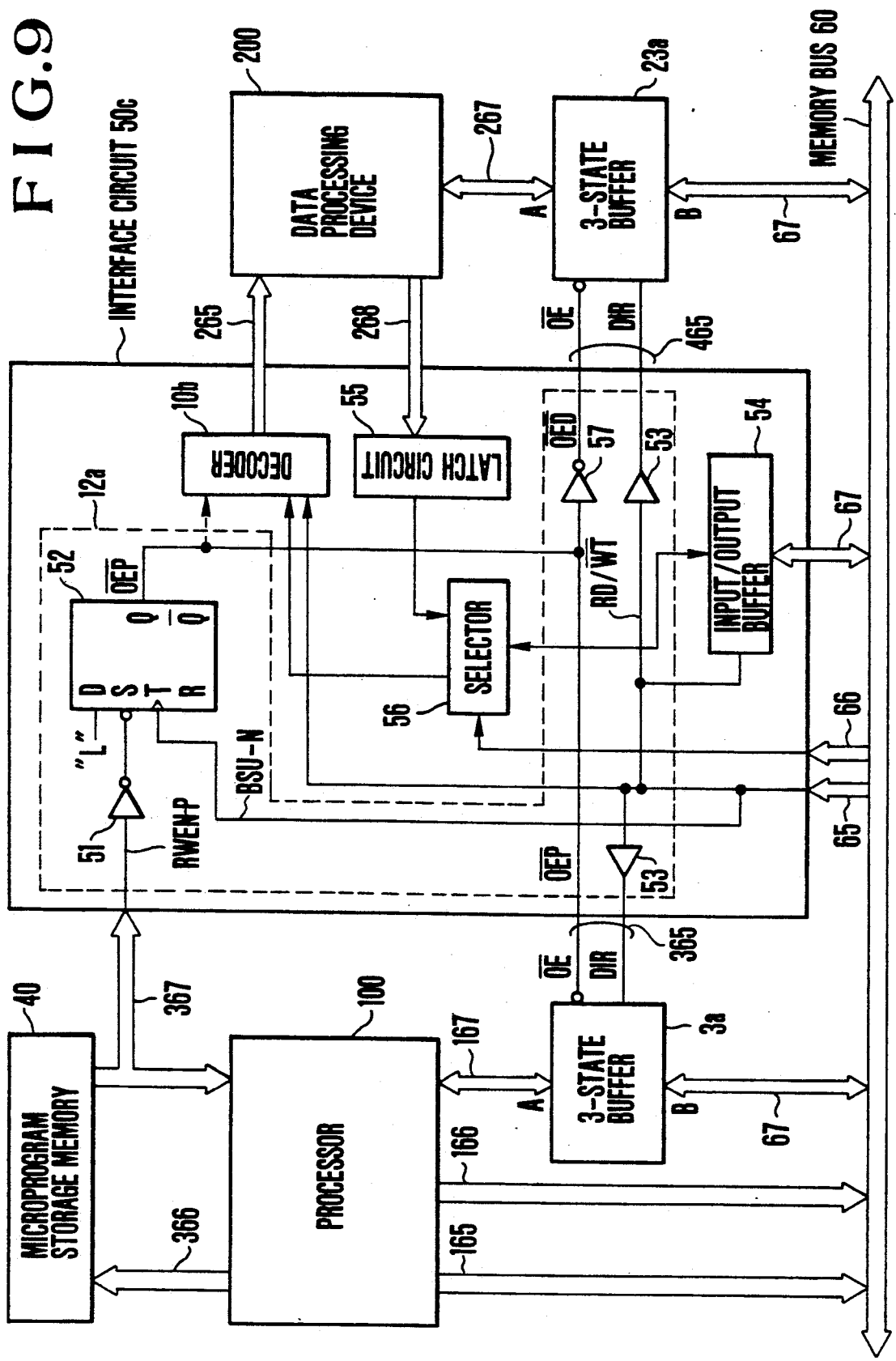
FIG. 9 is a diagram showing the detailed structure of the main part of the fourth embodiment of the invention.

FIG. 9 shows the internal structure of the interface circuit 50c and the detail of interconnection between signals to and from the processor 100, data processing device 200, and three-state buffers 3a and 23a. The interface circuit 50c is constructed of the decoder 10b and data transceiver high impedance setting circuit 12a. In the data transceiver high impedance setting circuit 12a, reference numeral 52 represents a flip-flop, for example, a D flip-flop which operates in accordance with the truth table shown in FIG. 10C.

The decoder 10b outputs a control signal for controlling the operations of the data processing device 200 in accordance with the contents of the microprogram and the status of the control line, or outputs a control signal to the data processing device 200 via the control line 265 as described previously by decoding data supplied from the memory bus 60. Reference numeral 55 represents a latch circuit which latches a status signal on the status line 268 outputted by the data processing device 200, and upon access from the processor 100, outputs the latched result to the data line 67 via a selector 56 and input/output buffer 54. The selector 56 connects the input/output buffer 54 either to the decoder 10b or to the latch circuit 55 in accordance with an address outputted from the processor 100 via the address line 66.

Specifically, when the control line 65 and address line 66 on the bus 60 indicate an instruction write into the data processing device, instruction data are inputted to the input/output buffer from the data line 67 and then to the decoder 10b which then gives an instruction to the data processing device 200 via the control line 265.

When the control line 65 and address line 66 indicate to read the status line 268 of the data processing device 200, the status of the status line 268 stored in the latch circuit 55 is given to the input/output buffer 54 via the selector 56, and the processor is caused to read the status via the data line 67 of the bus 60.

Figure 10:
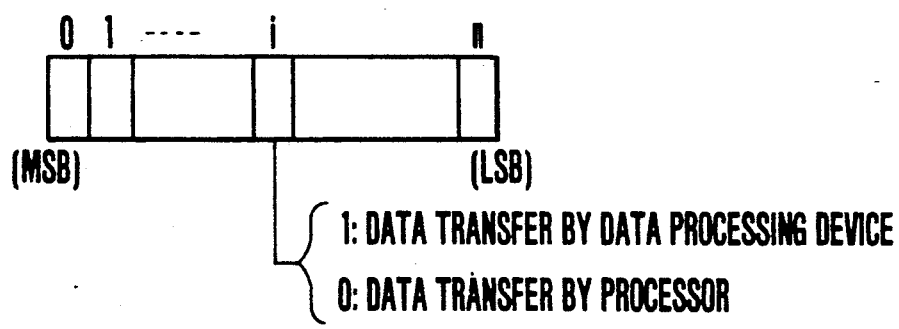
FIG. 10A is a truth table of the three-state buffer shown in FIG. 9.
FIG. 10B shows an example of the microprogram shown in FIG. 9.
FIG. 10C is a truth table of the D flip-flop shown in FIG. 9.
Figure 11:
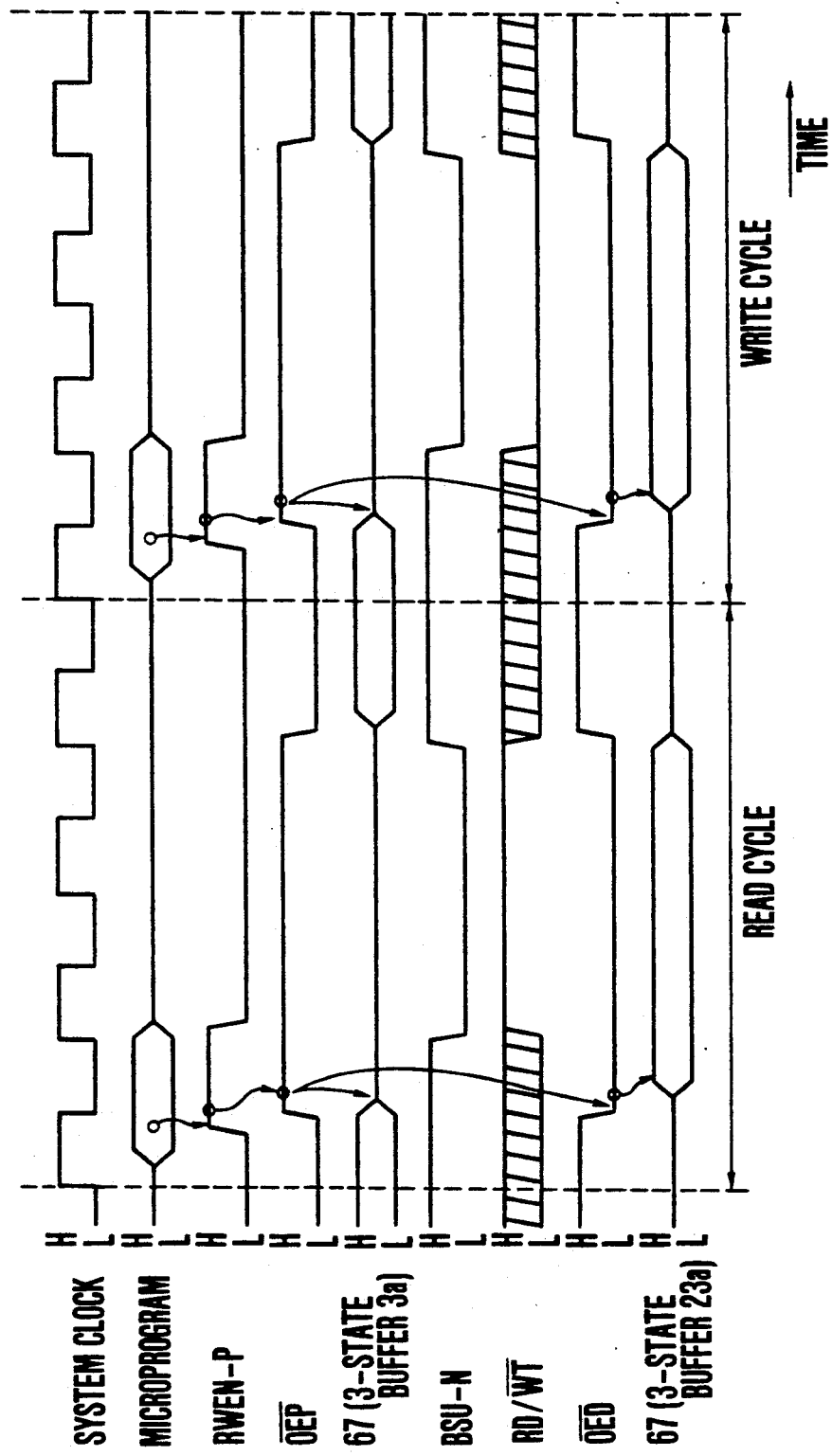
FIG. 11 is a timing chart showing signal wave-forms at various points in FIG. 9.

FIG. 11 shows briefly a timing chart for the circuit shown in FIG. 9. The operation of the embodiment will be described with reference to FIGS. 9, 10A–10C, and 11.

FIG. 10B shows an example of a microprogram read out from the memory 40 by the processor 100. The i-th bit among n bits for example has information indicating whether data transfer is to be performed by the data processing device 200 or by the processor 100. Namely, if the i-th bit is "1", it indicates that data transfer is performed for example by the data processing device, whereas if "0", it indicates that data transfer is performed by the processor. It is to be noted that such information may be represented not only by the i-th bit but also by a combination of plural bits.

The processor 100 executes data transfer and calculation in accordance with the program from the memory 40. In this case, if the i-th bit of the program shown in FIG. 10B is "1", only an address signal and bus control signal are outputted to the address line 66 and data line 67 of the common bus 60, and the data line should be set at a high impedance. However, if the hardware of the processor 100 is not constructed to perform such operation, a portion of the data (control instruction) obtained upon access to the storage memory 40 by the processor 100 is inputted to the interface circuit 50c via the data line 67.

It is assumed that the microprogram of the processor 100 is constructed of n bits as shown in FIG. 10B and that the data processing device 200 is controlled by the i-th bit to perform a data input/output process. The i-th bit data are picked up by a signal line called RWEN-P and inputted to the interface circuit 50c. In the interface circuit 50c, if RWEN-P is "H", the output of the inverter 51 becomes "L" and the Q output $\overline{OEP}$ of the D flip-flop 52 becomes "H". Since the Q output $\overline{OEP}$ is connected to an $\overline{OE}$ terminal of the three-state buffer 3a which is set at a high impedance in accordance with the truth table value shown in FIG. 10A so that the data line 167 of the processor 100 is electrically isolated from the common bus 60. At the same time, when the Q output $\overline{OEP}$ which is "H" is inputted to another inverter 57, its output $\overline{OED}$ becomes "L" and an $\overline{OE}$ terminal of the three-state buffer 3a becomes "L" to release the high impedance state so that the data processing device 200 and the common bus are electrically connected.

The memory 8 and input/output unit 70 are accessed using an address and bus control signals including a bus use signal BSU-N and read/write control signal RD/$\overline{WT}$ all outputted from the processor 100. In the read operation, as apparent from the timing chart shown in FIG. 11, the memory 8 or input/output unit 70 outputs data onto the common bus 60. In the interface circuit 50c, the decoder 10b outputs a control signal to the data processing device 200 during the time while the bus use signal BSU-N is "L", in accordance with the combination of the read/write control signal RD/$\overline{WT}$ and Q output OEP, so that the data on the common bus 60 are read by the data processing device 200. In the write operation, a control signal for data output on the common bus 60 is given to the data processing device 200 to cause it to output data to be written to the memory 8 or input/output unit 70. After completion of data transfer, the processor 100 changes the bus use signal BSU-N which is connected to the T terminal of the D flip-flop 52 of the interface circuit 50c from "L" to "H". The signal "L" at the D terminal is delivered at the leading edge of BSU-N to the Q output to change the Q output $\overline{OEP}$ to "L". When the Q output $\overline{OEP}$ becomes "L", the three-state buffer 3a is released from the high impedance state, whereas the three-state buffer 23a is set at the high impedance state.

As described above, each time the processor 100 accesses the storage memory 40, the signal line RWEN-P is established. Therefore, without changing the hardware within the processor 100, it is possible to determine whether data input/output is to be performed by the processor 100 or by the data processing device 200. Further, data transfer between the memory 8 or input/output unit 70 and the data processing device 200 can be performed without first reading data into the processor 100.

As described so far, according to the present invention, a memory read/write of the co-processor can be executed using the memory access control function of the main processor. Therefore, it is not necessary to provide a memory access control function on the side of the co-processor so that the co-processor development work can be simplified and its cost can be reduced. Further, data transfer between the co-processor and the memory can be performed during the time while the main processor controls a memory read/write. Therefore, the logic circuits necessary for practicing the present invention are very simple circuitry constructed of a decoder for supervising the execution status of the main processor, a data transceiver and a control circuit for the data transceiver, and can be easily realized.

More in particular, according to the present invention, data transfer by the co-processor can be realized during the data transfer cycle of the main processor by connecting the main processor and co-processor to a common bus, the main processor having no dedicated input terminal for externally setting the data line at a high impedance, and the co-processor such as a data processing device having no means for generating an address and control signal. Therefore, the system overhead of data transfer can be reduced to minimum. Further, since the data line can be set at a high impedance without changing the hardware of the processor, a presently available processor can be used in structuring the system, thus realizing a shortened system development period and a low cost.

In the above embodiments, essential constitutional elements of this invention such as a data transceiver, three-state buffer, interface circuit and the like may be provided outside of or within the main processor and co-processor.

We claim:

1. A data transfer control apparatus for a co-processor system, said co-processor system including:
   a memory;
   a memory bus connected to said memory;
   a main processor connected to said memory bus and having a control circuit for controlling data read/write relative to said memory, said main processor performing data transfer from/to said memory bus via first data input/output terminal means; and
   a co-processor connected to said memory bus via second data input/output terminal means;
   said data transfer control apparatus comprising:
   high impedance setting means for selectively setting said first data input/output terminal means at a high impedance state to electrically isolate said first data input/output terminal means from said memory bus; and
   control signal generating means for selectively outputting a control signal to said high impedance setting means to cause said high impedance setting means to set said first data input/output terminal means at said high impedance state;
   wherein, when said co-processor is to perform data read/write relative to said memory, said control signal generating means generates said control signal to cause said high impedance setting means to set said first data input/output terminal means at said high impedance state, and while said first data input/output terminal means is set at said high impedance state, said main processor performs read/write control of said memory bus, and said co-processor performs data transfer from/to said memory bus via said second data input/output terminal means.

2. A data transfer control apparatus for a co-processor system according to claim 1, further comprising control means for controlling said second data input/output terminal means, said control means allowing data transfer between said co-processor and said memory bus via said second data input/output terminal means in accordance with said control signal.

3. A data transfer control apparatus for a co-processor system according to claim 2, wherein said memory bus comprises a control bus, an address bus, and a data bus, said first and second data input/output terminal means are connected to said data bus, and said high impedance setting means electrically isolates said first data input/output terminal means from said data bus in response to said control signal.

4. A data transfer control apparatus for a co-processor system according to claim 1, wherein said control signal generating means includes decoding means for decoding a status signal representative of information regarding an execution instruction and an instruction execution status of said main processor, and said decoding means generates said control signal when said decoded status signal represents a memory read/write control instruction of said co-processor.

5. A data transfer control apparatus for a co-processor system according to claim 1, wherein said control signal generating means includes decoding means for decoding a status signal representative of information regarding an execution instruction such as an instruction execution status of said main processor and, said decoding means generates said control signal when said decoded status signal represents a memory read/write control instruction of said co-processor.

6. A data transfer control apparatus for a co-processor system according to claim 1, wherein said co-processor outputs a request signal for requesting a read/write service of said memory when said co-processor is to perform data read/write relative to said memory;
wherein said main processor responds to said request signal and outputs an instruction word to said control signal generating means when a status for executing said read/write service is established; and
wherein said control signal generating means decodes said instruction word to generate said control signal.

7. A data transfer control apparatus for a co-processor system according to claim 6, further comprising register means for storing said request signal from said co-processor, wherein said main processor accesses said register means via said memory bus to cause said register means to output said request signal onto said memory bus, and said main processor reads said request signal from said memory bus.

8. A data transfer control apparatus for a co-processor system according to claim 1, wherein said control signal generating means reads a program being executed by said main processor to determine if memory read/write control of said co-processor is to be performed, and if it is determined that memory read/write control of said co-processor is to be performed, said control signal generating means generates said control signal.

9. A data transfer control apparatus for a co-processor system according to claim 8, wherein said program being executed by said main processor includes information representative of whether or not memory read/write control of said co-processor is to be performed.

10. A data transfer control method for a co-processor system, said co-processor system including:
a memory;
a memory bus connected to said memory;
a main processor connected to said memory bus and having a control circuit for controlling data read/write relative to said memory, said main processor performing data transfer from/to said memory bus via first data input/output terminal means; and
a co-processor connected to said memory bus via second data input/output terminal means;
said data transfer control method comprising the steps of:
generating a control signal when said co-processor is to perform data read/write relative to said memory; and
responding to said control signal by setting said first data input/output terminal means at a high impedance state to electrically isolate said first data input/output terminal means from said memory bus;
wherein, while said first data input/output terminal means is set at said high impedance state, said main processor performs read/write control of said memory bus and said co-processor performs data transfer from/to said memory bus via said second data input/output terminal means.

11. A data transfer control method for a co-processor system according to claim 10, wherein said second data input/output terminal means allows data transfer between said co-processor and said memory bus via said second data input/output terminal means in accordance with said control signal.

12. A data transfer control method for a co-processor system according to claim 11, wherein said memory bus comprises a control bus, an address bus, and a data bus, said first and second data input/output terminal means are connected to said data bus, and said first data input/output terminal means electrically isolates said first data input/output terminal means from said data bus in response to said control signal.

13. A data transfer control method for a co-processor system according to claim 10, further comprising the steps of decoding an address signal from said main processor on said memory bus, and when said decoded address signal represents a memory read/write control instruction of said co-processor, generating said control signal.

14. A data transfer control method for a co-processor system according to claim 10, further comprising the steps of:
decoding a status signal representative of information regarding an execution instruction such as an instruction execution status of said main processor; and
generating said control signal when said decoded status signal represents a memory read/write control instruction of said co-processor.

15. A data transfer control method for a co-processor system according to claim 10, further comprising the steps of:
outputting from said co-processor a request signal for requesting a read/write service of said memory when said co-processor is to perform data read/write relative to said memory;
responding to said request signal at said main processor and outputting an instruction word from said main processor when a status for executing said read/write service is established; and
decoding said instruction word to generate said control signal.

16. A data transfer control method for a co-processor system according to claim 15, further comprising the steps of:
storing said request signal from said co-processor in register means;
accessing said register means from said main processor via said memory bus to cause said register means to output said request signal onto said memory bus; and
reading said request signal into said main processor from said memory bus.

17. A data transfer control method for a co-processor system according to claim 10, further comprising the steps of:

reading a program being executed by said main processor to determine if memory read/write control of said co-processor is to be performed; and if it is determined that memory read/write control of said co-processor is to be performed, generating said control signal.

18. A data transfer control method for a co-processor system according to claim 17, wherein said program being executed by said main processor includes information representative of whether or not memory read/write control of said co-processor is to be performed.

* * * * *